(12) United States Patent
Kobayashi et al.

(10) Patent No.: US 10,007,277 B2
(45) Date of Patent: Jun. 26, 2018

(54) PRESSURE REGULATING VALVE

(71) Applicant: AISAN KOGYO KABUSHIKI KAISHA, Obu-shi, Aichi-ken (JP)

(72) Inventors: Masahiro Kobayashi, Toyohashi (JP); Mitsuyoshi Itahara, Obu (JP); Kazuhiro Nakamura, Ichinomya (JP); Hideyuki Fukuda, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 14 days.

(21) Appl. No.: 15/284,789

(22) Filed: Oct. 4, 2016

(65) Prior Publication Data
US 2017/0115673 A1 Apr. 27, 2017

(30) Foreign Application Priority Data
Oct. 22, 2015 (JP) ................. 2015-207685

(51) Int. Cl.
*G05D 16/10* (2006.01)
*F16K 1/30* (2006.01)
*F16K 31/122* (2006.01)
(52) U.S. Cl.
CPC ........... *G05D 16/103* (2013.01); *F16K 1/307* (2013.01); *F16K 31/1221* (2013.01); *G05D 16/106* (2013.01)
(58) Field of Classification Search
CPC ......... Y10T 137/7818; Y10T 137/7819; F16K 1/307; F16K 31/1221; G05D 16/10; G05D 16/103; G05D 16/106

USPC ........................................ 137/505.34, 505.35
See application file for complete search history.

(56) References Cited

U.S. PATENT DOCUMENTS

| | | | | | |
|---|---|---|---|---|---|
| 240,018 | A | * | 4/1881 | Gruber ................... | B01D 29/15 137/505.35 |
| 399,565 | A | * | 3/1889 | Rueff .................. | F16K 31/0655 137/495 |
| 552,202 | A | * | 12/1895 | Scott ....................... | F17C 13/04 137/505.35 |
| 1,961,589 | A | * | 6/1934 | Kearny .................. | G05D 16/10 137/505.35 |
| 2,161,544 | A | * | 6/1939 | Baker ................ | G05D 16/0663 137/505.35 |
| 2,208,261 | A | * | 7/1940 | Jackson ............. | G05D 16/0647 137/505.35 |

(Continued)

FOREIGN PATENT DOCUMENTS

JP 2006140132 A 6/2006
JP 2011108057 A 6/2011

*Primary Examiner* — William McCalister
(74) *Attorney, Agent, or Firm* — Oliff PLC

(57) ABSTRACT

A pressure regulating valve to regulate a pressure of fuel gas includes a valve seat, a valve element movable into or out of contact with the valve seat to shut off or allow a flow of fuel gas, and a piston placed facing the valve element by interposing the valve seat and being located downstream of the valve element in a flowing direction of the fuel gas. The pressure regulating valve further includes a holder placed more upstream than the valve element in the flowing direction of fuel gas. The holder includes a bottom-closed cylindrical part opening toward the upstream side, and a through hole formed through the bottom-closed cylindrical part from its inner peripheral surface to outer peripheral surface.

5 Claims, 4 Drawing Sheets

(56) References Cited

U.S. PATENT DOCUMENTS

| | | | | |
|---|---|---|---|---|
| 2,287,992 | A * | 6/1942 | Grove | F16K 1/32 |
| | | | | 137/505.37 |
| 2,587,728 | A * | 3/1952 | Hoskins | G05D 16/0663 |
| | | | | 137/505.35 |
| 2,731,033 | A * | 1/1956 | Cable | G05D 16/10 |
| | | | | 137/494 |
| 3,693,652 | A * | 9/1972 | Iung | F16K 17/30 |
| | | | | 137/505.34 |
| 3,812,877 | A * | 5/1974 | Fleischhacker | G05D 16/0663 |
| | | | | 137/116.5 |
| 4,489,751 | A * | 12/1984 | Acomb | G05D 16/0633 |
| | | | | 137/484.8 |
| 4,964,611 | A * | 10/1990 | Andersson | F16K 31/383 |
| | | | | 137/454.5 |
| 5,520,214 | A * | 5/1996 | Mack | F16K 1/306 |
| | | | | 137/505.34 |
| 2004/0134536 | A1* | 7/2004 | Phillips | F16K 1/305 |
| | | | | 137/505.35 |
| 2008/0202604 | A1* | 8/2008 | Dalton | F16K 1/385 |
| | | | | 137/505.35 |
| 2011/0114867 | A1 | 5/2011 | Suzuki et al. | |

\* cited by examiner

PRESSURE REGULATING VALVE

CROSS-REFERENCE TO RELATED APPLICATIONS

This application is based upon and claims the benefit of priority from the prior Japanese Patent Application No. 2015-207685, filed Oct. 22, 2015, the entire contents of which are incorporated herein by reference.

BACKGROUND

Technical Field

The present invention relates to a valve seat for regulating the pressure of fuel gas to be supplied from a fuel tank to a supply destination to desired pressure by reducing the pressure.

Related Art

Patent Document 1 discloses a pressure regulating valve for regulating a secondary-side pressure of hydrogen gas by regulating an opening degree of a valve element according to the pressure or the urging force acting on a valve element and a diaphragm.

RELATED ART DOCUMENTS

Patent Documents

Patent Document 1: Japanese unexamined patent application publication No. 2006-140132

SUMMARY

Technical Problems

In the pressure regulating valve disclosed in Patent Document 1, however, if the valve element instantaneously receives a large force of high-pressure hydrogen gas supplied through a primary-side inlet port, the valve element may be deformed.

The present invention has been made in view of the circumstances to solve the above problems and has a purpose to provide a pressure regulating valve capable of preventing deformation of a valve element.

Means of Solving the Problems

To achieve the above purpose, one aspect of the invention provides a pressure regulating valve comprising: a valve seat member; a valve element configured to come into contact with and separate from the valve seat member to shut off and allow a flow of a fluid; and a piston placed on a downstream side of the valve element in a flowing direction of the fluid to face to the valve element by interposing the valve seat member; the pressure regulating valve being configured to regulate pressure of the fluid, wherein the pressure regulating valve further comprises a diffusion member placed on an upstream side of the valve element in the flowing direction of the fluid, and the diffusion member includes: a bottom-closed cylindrical part opening toward the upstream side; and a through hole extending between an inner peripheral surface and an outer peripheral surface of the bottom-closed cylindrical part.

According to the above configuration, during valve opening of the pressure regulating valve, a fluid flows in an opening part of the bottom-closed cylindrical part of the diffusion member and then passes through the through hole to flow to the outside of the outer peripheral surface of the bottom-closed cylindrical part. With the diffusion member covering an upstream part of the valve element, accordingly, a flow of the fluid is dispersed outward in a radial direction of the valve element. Accordingly, even when a high-pressure fluid suddenly flows in the pressure regulating valve, the pressure of the fluid is less likely to act on the valve element. Thus, the force to be instantaneously applied on the valve element is decreased. This can prevent deformation of the valve element.

DESCRIPTION OF EMBODIMENTS

<Structure of Pressure Regulating Valve>

Figure 1:
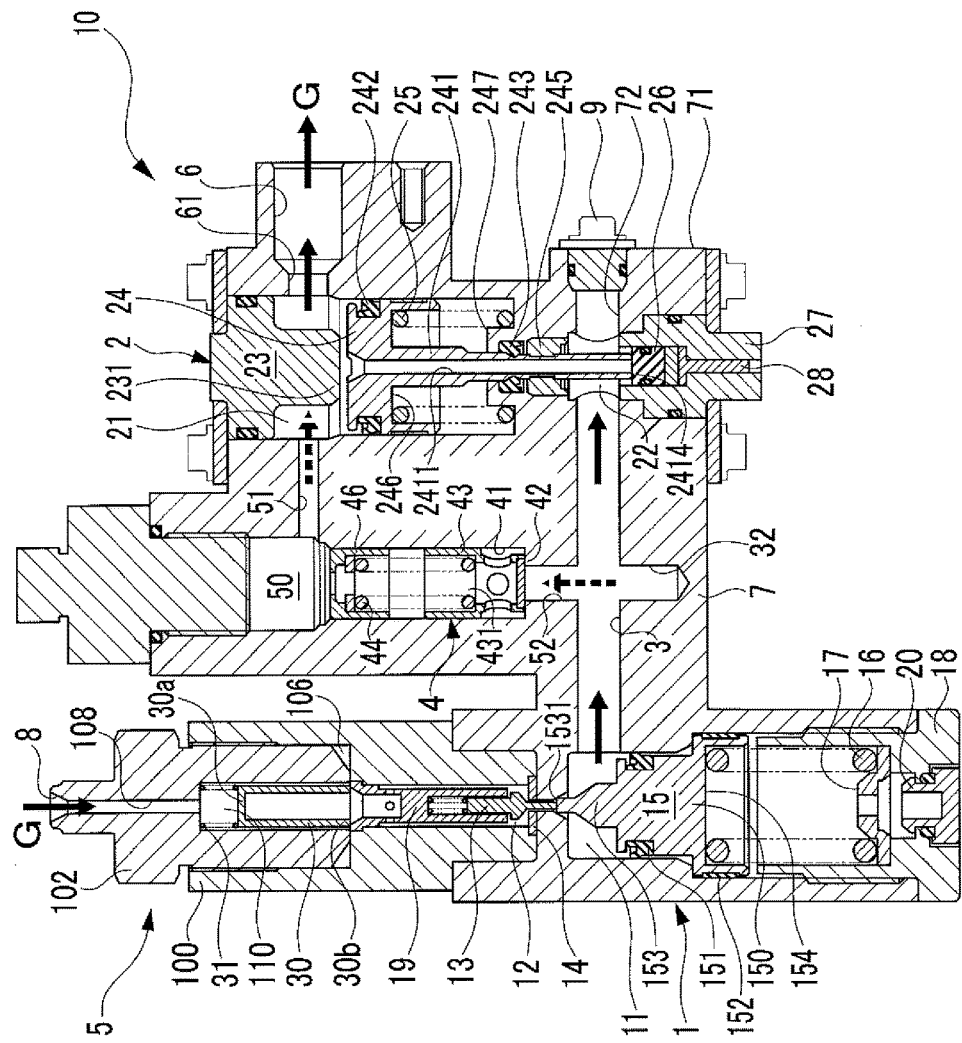
FIG. 1 is a cross sectional view of a pressure regulating valve in an embodiment.

A detailed description of a preferred embodiment of a pressure regulating valve 10 embodying the present invention will now be given referring to the accompanying drawings. The pressure regulating valve 10 shown in FIG. 1 is a pressure regulating valve for regulating the pressure of fuel gas G to desired pressure by reducing the pressure in multiple stages (two stages). The pressure regulating valve 10 includes an upstream pressure regulating valve 1, a downstream pressure regulating valve 2, an intermediate passage 3, a check valve 4, an inflow unit 5, and others. The pressure regulating valve 10 further includes a body member 7 made of aluminum alloy. This body member 7 is provided therein with a part of the upstream pressure regulating valve 1, the downstream pressure regulating valve 2, the intermediate passage 3, and the check valve 4.

The upstream pressure regulating valve 1 is placed in a position on an upstream side of the downstream pressure regulating valve 2 in a flowing direction of the fuel gas G (i.e., a direction indicated by arrows in FIG. 1) (hereinafter, simply referred to as an "upstream side"). The downstream pressure regulating valve 2 is placed in a position on a downstream side of the upstream pressure regulating valve 1 in the flowing direction of the fuel gas G (hereinafter, simply referred to as a "downstream side"). Those upstream pressure regulating valve 1 and downstream pressure regulating valve 2 are connected in series to each other through the intermediate passage 3. The intermediate passage 3 is a channel which the fuel gas G having a pressure after reduced by the upstream pressure regulating valve 1 but before reduced by the downstream pressure regulating valve 2 flows in and passes through. The check valve 4 is connected with the intermediate passage 3 and operated to control the pressure of the intermediate passage 3 to below a predetermined set pressure. The inflow unit 5 is placed upstream of the upstream pressure regulating valve 1 and admits the fuel gas G into the pressure regulating valve 10.

The fuel gas G is for example hydrogen gas to be supplied to a fuel battery or cell (not shown). An upstream end of the pressure regulating valve 10 is coupled to a main stop valve (not shown) for permitting or stopping supply of the fuel gas G stored in a fuel tank (not shown). A downstream end of the pressure regulating valve 10 is coupled to an injector (not shown) for supplying the fuel gas G of which the pressure has been regulated to desired pressure. In some cases, the fuel gas G stored in the fuel tank is filled at a pressure of about 80 to 90 MPa according to filling equipment. On the other hand, the pressure of fuel gas G to be supplied from the pressure regulating valve 10 to the injector is reduced to a pressure of about 1.0 to 1.5 MPa. Thus, the pressure regulating valve 10 reduces the pressure of the fuel gas G for example from about 80 to 90 MPa to about 3.0 to 5.0 MPa in the upstream pressure regulating valve 1 and then from about 3.0 to 5.0 MPa to about 1.0 to 1.5 MPa in the downstream pressure regulating valve 2.

(Upstream Pressure Regulating Valve)

The upstream pressure regulating valve 1 is provided with a pressure-regulating chamber 11, a valve chamber 12, a valve element 13, a valve seat 14 (a valve seat member), a piston 15, a coil spring 16, a retainer 17, a stopper 18, a holder 19 (a diffusion member), and others.

The pressure-regulating chamber 11 is formed below the valve seat 14 (downstream of the valve seat 14) and communicated with the valve chamber 12 when the valve element 13 is moved upward (in a direction away from the valve seat 14). The valve chamber 12 is communicated with an inlet 8. In the present embodiment, inside the valve chamber 12, the valve element 13 and the holder 19 are arranged.

The valve element 13 is movable up and down within the valve chamber 12 to separate from and come into contact with the valve seat 14 in order to allow or shut off a flow of the fuel gas G to the chamber 11. The valve element 13 is made of for example stainless steel (e.g., SUS316L (JIS)). The valve seat 14 is placed at a bottom of the valve chamber 12. The piston 15 is placed in a position toward which the valve element 13 is urged by a valve spring 134 (see FIG. 2). The piston 15 is movable up and down within the pressure-regulating chamber 11. The thus configured piston 15 is placed on a downstream side of the valve element 13 to face to a seal part 132 of the valve element 13 by interposing the valve seat 14. The piston 15 is made of for example aluminum (e.g., A6061-T6 (JIS)). The coil spring 16 urges the piston 15 upward (in a direction toward the valve element 13). The retainer 17 retains the coil spring 16 while contacting a lower end of the coil spring 16. The stopper 18 is threadedly engaged in the body member 7 so as to enable adjustment of the height of the retainer 17.

Figure 2:
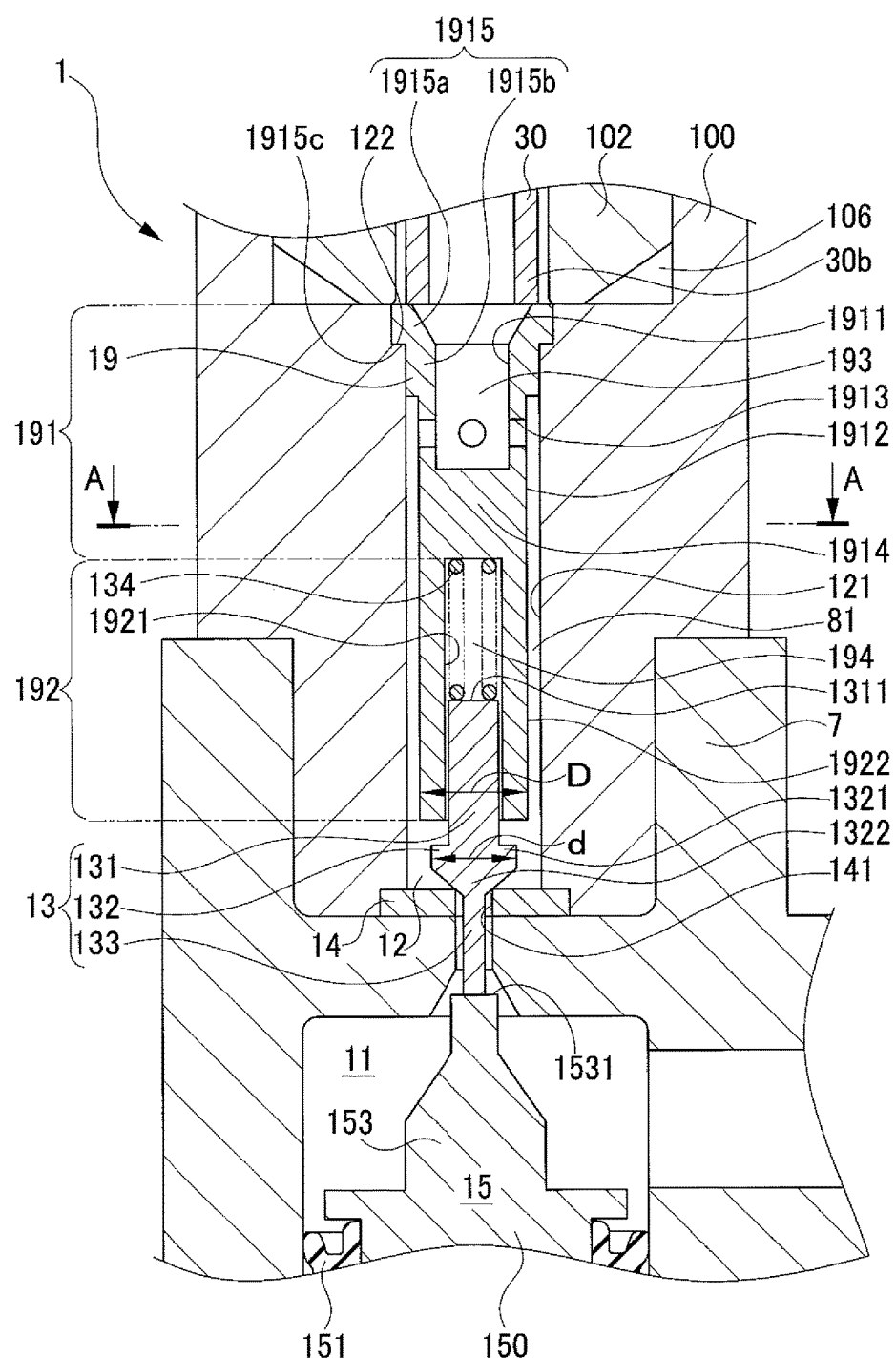
FIG. 2 is an enlarged cross sectional view of an upstream pressure regulating valve (during valve closing)
Figure 3:
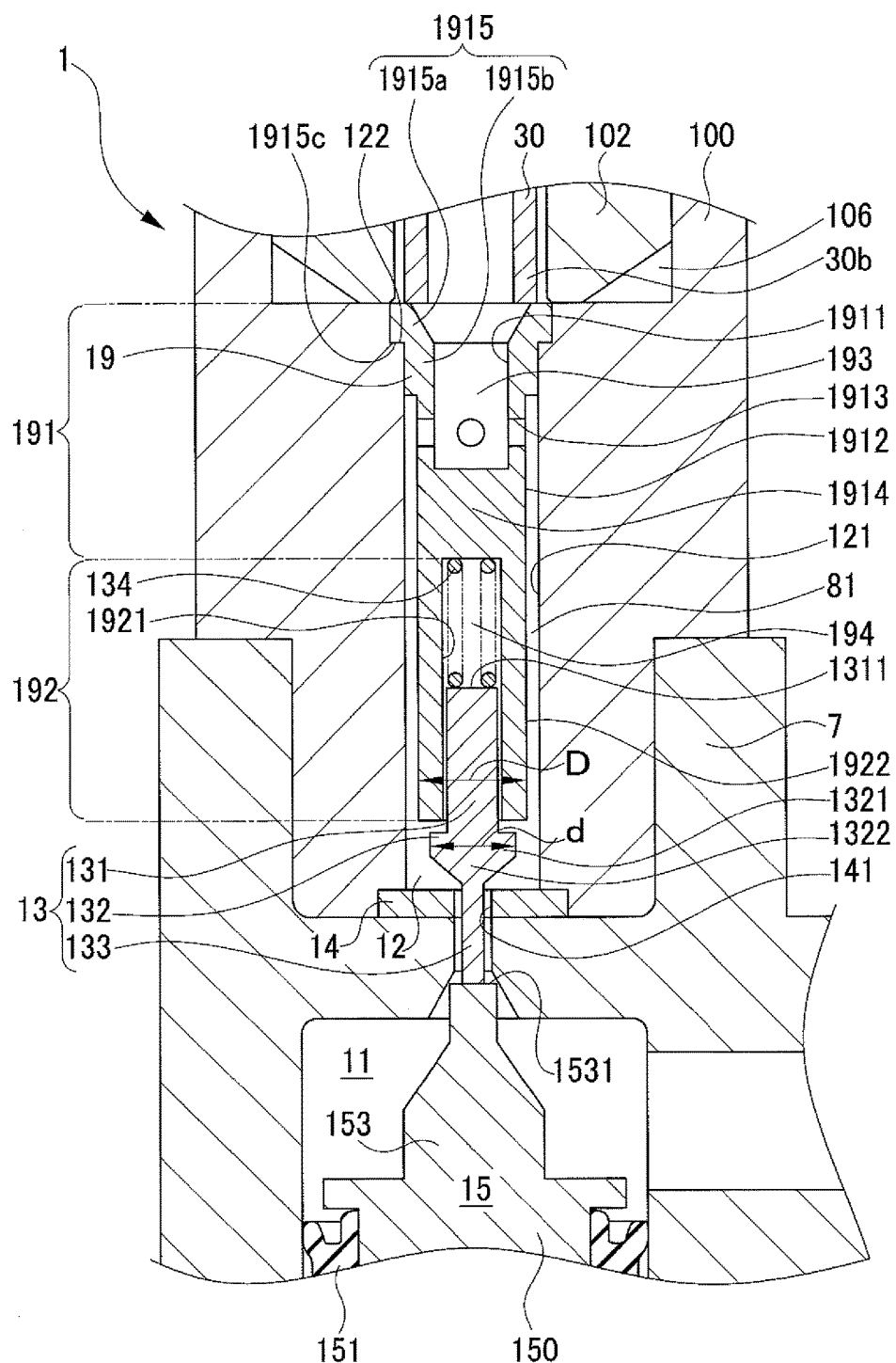
FIG. 3 is an enlarged cross sectional view of the upstream pressure regulating valve (during valve opening)

In the present embodiment, as shown in FIGS. 2 and 3, the valve element 13 is provided with a columnar part 131, the seal part 132, and a needle-shaped needle part 133, which are arranged in this order from the upstream side. The columnar part 131 is upstream of and continuous with the seal part 132. The seal part 132 is brought in contact with the valve seat 14 during valve closing as shown in FIG. 2. In the present embodiment, the seal part 132 has such a shape that an upstream portion 1321 is columnar and a downstream portion 1322 is tapered with a decreasing outer diameter toward the downstream side. The upstream portion 1321 is continuous with the columnar part 131. The downstream portion 1322 is brought in contact with the valve seat 14 during valve closing. The needle part 133 is formed on a downstream side (on a side close to the piston 15) of the seal part 132 and extends through the through hole 141 formed in the valve seat 14 to the pressure-regulating chamber 11. A lower end of the needle part 133 (a downstream end) is in contact with a top surface 1531 of a projecting part 153 projecting from an upper end (an end close to the valve element 13) of a main part 150 of the piston 15. The main part 150 has a substantially columnar shape.

In the present embodiment, as shown in FIGS. 1 to 3, within the valve chamber 12, the holder 19 is placed in a position upstream of the valve element 13, more specifically, in a position more upstream than the seal part 132 of the valve element 13. The holder 19 has a substantially cylindrical shape, more concretely, a substantially cylindrical shape including a solid portion provided partly in an axial direction and a remaining hollow portion. The holder 19 is made of for example stainless steel.

The holder 19 is provided with a bottom-closed cylindrical part 191, a downstream wall part 192, an upstream opening part 193, a downstream opening part 194, and others. The bottom-closed cylindrical part 191 has a bottom-closed cylindrical shape, which is open on the upstream side (on a side toward the inlet 8). Herein, the bottom-closed cylindrical shape means a hollow cylindrical shape having a closed bottom.

Inside an inner peripheral surface 1911 of the bottom-closed cylindrical part 191, the upstream opening part 193 is formed. Further, the bottom-closed cylindrical part 191 is provided with a plurality of through holes 1913 each extending through the wall of the bottom-closed cylindrical part 191 between the inner peripheral surface 1911 and the outer peripheral surface 1912 to open on those surfaces. In the present embodiment, the through holes 1913 are arranged radially and spaced at predetermined intervals, e.g., equal intervals, in a circumferential direction of the bottom-closed cylindrical part 191. The number of through holes 1913 in the present embodiment is four, but it is not particularly limited thereto, and it may be two, three, or five or more. Although each through hole 1913 in the present embodiment has a circular section, the through hole is not limited thereto and may be a long hole extending in the circumferential direction of the bottom-closed cylindrical part 191 or a slot hole extending in the axial direction of the bottom-closed cylindrical part 191.

The downstream wall part 192 is cylindrical and extends from a bottom portion 1914 of the bottom-closed cylindrical part 191 toward the downstream side (a lower side in FIG. 2). In the present embodiment, the outer diameter of the bottom portion 1914 of the bottom-closed cylindrical part 191 is equal to the outer diameter of the downstream wall part 192. The downstream wall part 192 opens toward the downstream side and has an inner peripheral surface 1921 defining a downstream opening part 194. In the present embodiment, the outer diameter D of the downstream wall part 192 is larger than the outer diameter d of the upstream portion 1321 of the seal part 132 of the valve element 13. In the present embodiment, therefore, the seal part 132 of the valve element 13 is covered by the downstream wall part 192 from the upstream side. The holder 19 is placed in a position such that the seal part 132 of the valve element 13 does not contact with the holder 19 during valve opening, as shown in FIG. 3.

In the downstream opening part 194 of the downstream wall part 192, the columnar part 131 of the valve element 13 (at least an end portion 1311 of the columnar part 131 located on the upstream side (on an opposite side from the valve seat 14)) is housed. Between the bottom portion 1914 of the bottom-closed cylindrical part 191 and the columnar part 131 of the valve element 13, there is placed a valve spring 134 (an urging member) urging the valve element 13 downward (in a direction toward the valve seat 14).

In the present embodiment, the outer passage 81 is formed between an outer peripheral surface 1922 of the downstream wall part 192 and an inner peripheral surface 121 of the valve chamber 12 to allow the fuel gas G flowing out of the through holes 1913 to flow through the outer passage 81. The inner peripheral surface 121 of the valve chamber 12 is a surface formed in the block member 100 and also a surface surrounding the valve chamber 12.

In the present embodiment, the holder 19 is provided with a protruding part 1915 at an end portion of the bottom-closed cylindrical part 191 on the upstream side. The protruding part 1915 protrudes more outwardly in a radial direction than the outer peripheral surface 1912 of a part of the bottom-closed cylindrical part 191 other than the protruding part 1915. The protruding part 1915 includes a first protruding part 1915a on the upstream side and a second protruding part 1915b on the downstream side. The first protruding part 1915a protrudes more outwardly in the radial direction of the bottom-closed cylindrical part 191 than the second protruding part 1915b. Thus, the protruding part 1915 protrudes in two stages in the radial direction of the bottom-closed cylindrical part 191.

In the present embodiment, the holder 19 is mounted in the block member 100 in such a manner that the protruding part 1915 is fit in the block member 100. Specifically, the protruding part 1915 is fitly engaged with the block member 100 so that the outer peripheral surface of the first protruding part 1915a and the outer peripheral surface of the second protruding part 1915b contact with the inner peripheral surface 121 of the valve chamber 12, and a downstream end face 1915c of the first protruding part 1915a contacts with a step surface 122 of the valve chamber 12. Accordingly, the holder 19 is stably mounted in the block member 100.

On the outer peripheral surface of the main part 150 of the piston 15, there is fit an annular seal member 151 in contact with the inner peripheral surface of the pressure-regulating chamber 11 to seal the pressure-regulating chamber 11. The annular seal member 151 has a lip-shaped cross section that opens upward (in a direction toward the pressure-regulating chamber 11) in a V shape. A lower end of the piston 15 is formed with a recessed spring seat 154 holding the coil spring 16. On the outer peripheral surface of the spring seat 154, a slid member 152 made of fluorine resin is mounted.

As shown in FIG. 1, a filter member 20 is locked in the stopper 18. The pressure-regulating chamber 11 is communicated with the valve chamber 22 of the downstream pressure regulating valve 2 through the intermediate passage 3.

Figure 4:
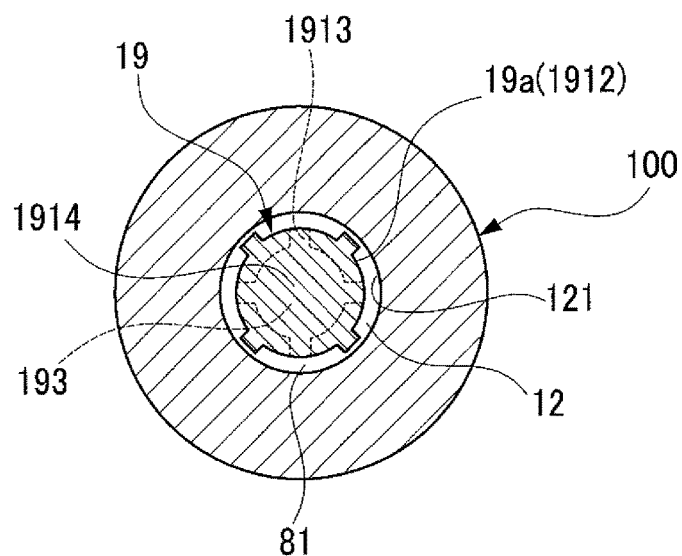
FIG. 4 is a cross sectional view of a holder and a block member in a first modified example, corresponding to a cross sectional view taken along a line A-A in FIG. 2.

As a first modified example, the outer passage 81 may be formed of grooves 19a formed in the outer peripheral surface of the holder 19, that is, in the outer peripheral surface 1912 of the bottom-closed cylindrical part 191 and the outer peripheral surface 1922 of the downstream wall part 192 as shown in FIG. 4. The grooves 19a are formed in the outer peripheral surface of the holder 19 to extend entirely or partly in the axial direction of the holder 19.

Figure 5:
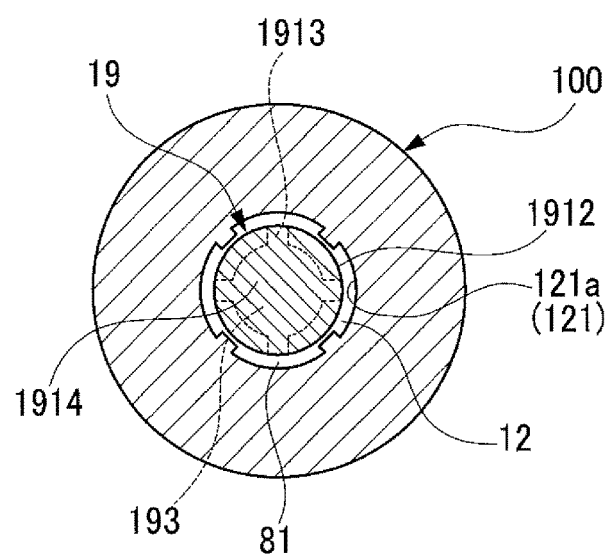
FIG. 5 is a cross sectional view of a holder and a block member in a second modified example, corresponding to a cross sectional view taken along the line A-A in FIG. 2.

As a second modified example, the outer passage 81 may be formed of grooves 121a formed in the inner peripheral surface 121 of the valve chamber 12 as shown in FIG. 5. The grooves 121a are formed in the inner peripheral surface 121 of the valve chamber 12 to extend entirely or partly in the axial direction of the valve chamber 12.

(Downstream Pressure Regulating Valve)

The downstream pressure regulating valve 2 is provided with a pressure-regulating chamber 21, a valve chamber 22, a piston 24, a valve element 241, a coil spring 25, a valve seat 26, a stopper 27, an adjustment screw 28, and others.

The pressure-regulating chamber 21 is communicated with an outlet 6 formed in the body member 7. The valve chamber 22 is provided below the pressure-regulating chamber 21, i.e., upstream of the pressure-regulating chamber 21. The piston 24 is movable up and down within the pressure-regulating chamber 21. The valve element 241 has a substantially cylindrical shape extending in an axial direction of the piston 24 to the valve chamber 22. The coil spring 25 urges the piston 24 upward (in a direction toward a cover 23). The valve seat 26 is placed at a bottom of the valve chamber 22 so that a lower end portion 2414 of the valve element 241 is brought into contact with or separated from the valve seat 26. The stopper 27 is fit in the body member 7 in a right lower end of the body member 7. In this stopper 27, the valve seat 26 is fit in contact with an inner peripheral surface of the stopper 27. The adjustment screw 28 is threadedly engaged with the inner peripheral surface of the stopper 27. With this adjustment screw 28, the height of the valve seat 26 can be adjusted.

The pressure-regulating chamber 21 is closed with the cover 23 mounted in the body member 7. The cover 23 is formed, in its lower part (on a side close to the piston 24), with a columnar-shaped protrusion 231 which restricts upward movement of the piston 24 when an upper end of the piston 24 contacts with the protrusion 231. When the columnar protrusion 231 contacts with the upper end of the piston 24, an annular cavity is formed in the pressure-regulating chamber 21. Between the pressure-regulating chamber 21 and the outlet 6, an outlet passage 61 is formed horizontally extending to allow communication between the pressure-regulating chamber 21 and the outlet 6.

The piston 24 and the valve element 241 are formed, at their center along a central axis, with a columnar through hole 2411 extending from the upper end of the piston 24 to a lower end of the valve element 241. On an outer peripheral surface of a main part of the piston 24, there is fit an annular seal member 242 placed in contact with the inner peripheral surface of the pressure-regulating chamber 21 to seal the pressure-regulating chamber 21. The annular seal member 242 has a lip-shaped cross section opening upward in a V shape. The lower end of the piston 24 is formed with a recessed spring seat 246 for holding the coil spring 25. The coil spring 25 is a cylindrical compression spring. A lower end of the coil spring 25 is locked by a retaining part 247 formed integral with the body member 7.

Under the retaining part 247, an annular seal member 243 is placed in contact with the outer peripheral surface of the valve element 241 to seal the valve chamber 22. The annular seal member 243 has a lip-shaped cross section opening downward (in a direction toward the valve chamber 22) in a V shape. Under this annular seal member 243, a bearing 245 is mounted to support the valve element 241 in an up-and-down movable manner. The bearing 245 is also used as a stopper for preventing the annular seal member 243 from dropping off. The valve chamber 22 is formed in a substantially cylindrical shape under the bearing 245.

(Intermediate Passage)

The intermediate passage 3 linearly extends to communicate with the pressure-regulating chamber 11 of the upstream pressure regulating valve 1 and the valve chamber 22 of the downstream pressure regulating valve 2. The intermediate passage 3 has a uniform inner diameter over its length. The body member 7 has a machining hole 72 formed to make the intermediate passage 3. In the outer wall surface 71 of the body member 7, a closing member 9 is secured to close the machining hole 72. Above the intermediate passage 3, the check valve 4 which will be described later is provided.

The intermediate passage 3 and the check valve 4 are communicated with each other through a check-valve inflow passage 52 formed extending in a vertical direction between the intermediate passage 3 and the check valve 4. Further, a trap passage 32 is formed by branching off from the intermediate passage 3.

(Check Valve)

The check valve 4 is provided with a valve chamber 41, an inlet portion 42 of the valve chamber 41, a valve element 43 housed in the valve chamber 41 and configured to be movable so as to come into contact with or separate from the inlet portion 42, a pressing spring 44 urging the valve element 43 against the inlet portion 42, and a holding member 46 holding the pressing spring 44. Between the valve chamber 41 and the pressure-regulating chamber 21 of the downstream pressure regulating valve 2, there are formed a check-valve outflow space part 50 and a check-valve outflow passage 51 through which the valve chamber 41 and the pressure-regulating chamber 21 are communicated with each other. The check-valve outflow passage 51 extends coaxially with the outlet passage 61. Further, the valve element 43 is formed with an internal passage 431 through which the upstream side and the downstream side of the valve chamber 41 are communicated with each other.

(Inflow Unit)

As shown in FIG. 1, the inflow unit 5 is provided with the block member 100, a plug 102, a filter 30, a hold-down spring 31, and others.

The block member 100 is fit in the body member 7 so that the valve seat 14 is sandwiched between the block member 100 and the body member 7. The block member 100 is provided with an inflow chamber 106, the valve chamber 12, and others. The inflow chamber 106 is formed in a position upstream of the valve chamber 12 and is provided therein with the plug 102, the filter 30, and the hold-down spring 31.

The plug 102 is screw-threaded in the inflow chamber 106 and fixed to the block member 100. The plug 102 is provided with, the inlet 8, an inlet passage 108, a filter holding part 110, and others. The inlet 8 is formed in a position upstream of the inlet passage 108 to allow the fuel gas G to flow in. The inflow passage 108 is a passage communicated with the inlet 8 and the filter holding part 110 to allow the fuel gas G flowing in the inlet 8 to flow to the filter holding part 110. This filter holding part 110 houses therein the filter 30 and the hold-down spring 31.

The filter 30 is made of metal and placed in a position upstream of the valve chamber 12 to cover the valve chamber 12. The filter 30 has a bottom-closed circular cylindrical shape, that is, a hollow cylindrical shape having a bottom 30a on the upstream side and an open end portion 30b on the downstream side (a lower end in FIG. 1). This shape prevents entrance of foreign substances in a more downstream side than the filter 30. The filter 30 is not particularly limited to the bottom-closed circular cylindrical shape and may have any bottom-closed cylindrical shape (e.g., an elliptically-cylindrical shape) other than the circular cylindrical shape mentioned above.

The filter 30 is urged toward the valve chamber 12 in a central axis direction of the filter 30 by the hold-down spring 31.

In the above-configured inflow unit 5, the fuel gas G flowing in the inlet 8 of the plug 102 flows through the inlet passage 108 and successively passes through the filter 30, then flowing in the valve chamber 12.

<Operations of Pressure Regulating Valve>

Operations (an operating method) of the pressure regulating valve 10 in the present embodiment will be described below. When the fuel gas G starts to be supplied for example to a vehicle fuel battery and therefore flows out in the direction indicated by arrows through the outlet 6, as shown in FIG. 1, the pressure of the fuel gas G stored in the pressure-regulating chamber 21 of the downstream pressure regulating valve 2 decreases. As the pressure of the fuel gas G in the pressure-regulating chamber 21 decreases, the fuel gas G in the valve chamber 22 is supplied to the pressure-regulating chamber 21 via the through hole 2411 formed in the piston 24 and the valve element 241, thereby increasing the pressure in the pressure-regulating chamber 21. When the pressure in the pressure-regulating chamber 21 reaches a desired pressure, the piston 24 presses down the coil spring 25, bringing the lower end portion 2414 of the valve element 241 into contact with the valve seat 26, thus stopping supply of the fuel gas G from the valve chamber 22 into the pressure-regulating chamber 21. It is to be noted that the pressure in the pressure-regulating chamber 21 can be set to a desired value (final pressure) by pre-adjustment of a screw-in amount of the adjustment screw 28.

Since the valve chamber 22 and the pressure-regulating chamber 11 are communicated with each other through the intermediate passage 3, when the pressure of the fuel gas G in the valve chamber 22 decreases, the fuel gas G stored in the pressure-regulating chamber 11 is caused to flow in the intermediate passage 3 in the direction indicated by the arrows.

As the fuel gas G stored in the pressure-regulating chamber 11 flows in the intermediate passage 3, the pressure in the valve chamber 22 rises. At that time, the pressure in the pressure-regulating chamber 11 decreases. Thus, the urging force of the coil spring 16 urging the piston 15 causes the piston 15 to slide in a direction (upward in FIG. 1) toward a side of the valve element 13 of the upstream pressure regulating valve 1. Specifically, the piston 15 moves toward the side of the valve element 13 while the annular seal member 151 is in contact with the inner peripheral surface of the pressure-regulating chamber 11 and the slide member 152 is in contact with the inner peripheral surface of the body member 7. Accordingly, the valve element 13 remaining in contact with the piston 15 is moved upward.

When the valve element 13 is moved upward, separating the seal part 132 from the valve seat 14 (see FIG. 3), the high-pressure fuel gas G supplied from a fuel tank is supplied to the pressure-regulating chamber 11 via the inlet 8, the inlet passage 108, the filter 30, the holder 19, and the valve chamber 12. In the present embodiment, the fuel gas G having passed through the filter 30 flows in the upstream opening part 193 of the holder 19 located in the valve chamber 12 and then passes through the through holes 1913 to flow in the outer passage 81. The fuel gas G flowing in the outer passage 81 then flows in a downstream part of the valve chamber 12 in which the seal part 132 of the valve element 13 is mounted. Thereafter, the fuel gas G passes through the through hole 141 of the valve seat 14 and flows in the pressure-regulating chamber 11.

Since the fuel gas G is supplied to the pressure-regulating chamber 11 in the above manner, the pressure of the fuel gas G in the pressure-regulating chamber 11 is maintained at a predetermined value. It is to be noted that the pressure in the pressure-regulating chamber 11 can be set to a predetermined value by ore-adjustment of a screw-in amount of the stopper 18.

In contrast, when supply of the fuel gas G to the fuel battery is stopped, the pressure of the fuel gas G stored in the pressure-regulating chamber 21 of the downstream pressure regulating valve 2 does not decrease. Thus, the pressure in the pressure-regulating chamber 11 of the upstream pressure regulating valve 1 also does not decrease. The piston 15 is thus caused to slide in a direction (downward in FIG. 1) opposite from the side of the valve element 13 against the urging force of the coil spring 16 urging the piston 15. Accordingly, the valve element 13 remaining in contact with the piston 15 is moved downward, bringing the seal part 132 into contact with the valve seat 14.

In accordance with sliding of the piston 15 according to a difference between the pressure in the valve chamber 12 and the pressure in the pressure-regulating chamber 11, the valve element 13 is caused to open or close. Specifically, upon start of supply of the fuel gas G to the fuel battery, the piston 15 slides toward the side of the valve element 13, causing the valve element 13 (the seal part 132) to separate from the valve seat 14. In contrast, upon stop of supply of the fuel gas G to the fuel battery, the piston 15 slides in the direction opposite from the side of the valve element 13, thereby causing the valve element 13 (the seal part 132) to contact with the valve seat 14 (see FIG. 2).

When supply of the fuel gas G to the fuel battery is stopped as above, the pressure of the fuel gas G stored in the pressure-regulating chamber 21 of the downstream pressure regulating valve 2 does not decrease. Accordingly, the fuel gas G leaking out of the upstream pressure regulating valve 1 into the intermediate passage 3 no longer has an escape route. This results in an increase in pressure in the intermediate passage 3. When the pressure of the fuel gas G in the intermediate passage 3 rises to a predetermined set value or higher, the valve element 43 of the check valve 4 is separated from the inlet portion 42. The check valve 4 is thus actuated. At that time, the fuel gas G is released from the intermediate passage 3 into the valve chamber 41 of the check valve 4 through the check-valve inflow passage 52. This makes it possible to avoid overload of the fuel gas G on the annular seal member 151 sealing the pressure-regulating chamber 11 of the upstream pressure regulating valve 1 continuous with the intermediate passage 3 and on the annular seal member 243 sealing the valve chamber 22 of the downstream pressure regulating valve 2. The fuel gas G released into the valve chamber 41 of the check valve 4 is then supplied to the outlet 6 through the internal passage 431 of the valve element 43, the check-valve outflow space part 50, the check-valve outflow passage 51, the pressure-regulating chamber 21 of the downstream pressure regulating valve 2, and the outlet passage 61.

<Operation Effects>

According the aforementioned embodiment, the upstream pressure regulating valve 1 includes the holder 19 placed more upstream than the valve element 13. This holder 19 includes the bottom-closed cylindrical part 191 opening toward the upstream side, and the through holes 1913 each extending through the wall of the cylindrical part 191 between the inner peripheral surface 1911 and the outer peripheral surface 1912 of the bottom-closed cylindrical part 191 to open on those surfaces.

With the above configuration, while the upstream pressure regulating valve 1 is in a valve open state, the fuel gas G flowing in the valve chamber 12 flows in the upstream opening part 193 of the holder 19 and then flows through the through holes 1913 into the outer passage 81. Thereafter, the fuel gas G flows through the outer passage 81, the downstream part of the valve chamber 12, and the through hole 141 of the valve seat 14, and then flows in the pressure-regulating chamber 11. At that time, much of the fuel gas G flows in an area radially outside of the valve element 13 in the downstream part of the valve chamber 12. In other words, the holder 19 covering the upstream area of the seal part 132 of the valve element 13 disperses a flow of the fuel gas G outwardly in a radial direction of the valve element 13.

Even when high-pressure fuel gas G suddenly flows in the valve chamber 12, consequently, the pressure of the fuel gas G is less likely to act on the seal part 132 of the valve element 13. Thus, the force instantaneously acting on the valve element 13 in a direction toward the piston 15 can be reduced. Accordingly, deformation of the valve element 13 (e.g., deformation of the needle part 133) is prevented. Also, deformation of the piston 15 is prevented. The wording "when high-pressure fuel gas G suddenly flows in the valve chamber 12" includes for example the time when a main stop valve (not shown) is turned from a valve closed state to a valve open state and fuel gas G starts to be supplied from a fuel tank (not shown).

Since the valve element 13 is prevented from deformation as above, for example the outer diameter of the needle part 133 can be designed as small as possible. Accordingly, the diameter of the through hole 141 of the valve seat 14 can be set to a minimum. This decreases the force acting on the through hole 141 by a pressure difference between the pressure in the valve chamber 12 and the pressure in the pressure-regulating chamber 11 during pressure regulation. Thus, the adjustment pressure, that is, the pressure in the pressure-regulating chamber 11, can be prevented from varying. Further, there is no need to increase the outer diameter of the piston 15. This can avoid an increase in size of the upstream pressure regulating valve 1 (the pressure regulating valve 10).

The holder 19 includes the cylindrical downstream wall part 192 extending from the bottom portion 1914 of the bottom-closed cylindrical part 191 to the downstream side. The columnar part 131 of the valve element 13 is housed in the downstream opening part 194 defined by the inner peripheral surface 1921 of the downstream wall part 192. The outer passage 81 is formed between the outer peripheral surface 1922 of the downstream wall part 192 and the inner peripheral surface 121 of the valve chamber 12 to allow the fuel gas G flowing out of the holder 19 through the through holes 1913 to flow therethrough.

Accordingly, during up-and-down movement of the valve element 13, the valve element 13 is guided by the downstream opening part 194 of the holder 19. This enables the valve element 13 to stably move up and down. Further, the fuel gas G caused to flow through the outer passage 81 is effectively dispersed outward in a radial direction of the valve element 13. Thus, the force acting on the valve element 13 in the direction toward the piston 15 is further reduced.

The through holes 1913 of the holder 19 are radially arranged in a plurality of places spaced in the circumferential direction of the bottom-closed cylindrical part 191. Thus, the fuel gas G flowing in the valve chamber 12 flows in the upstream opening part 193 of the holder 19 and then flows in the through holes 1913 spaced in the circumferential direction of the bottom-closed cylindrical part 191, through which the fuel gas G is dispersed radially. This enables reducing the force acting on the valve element 13 in the direction toward the piston 15.

The holder 19 further includes the protruding part 1915 on the upstream end portion of the bottom-closed cylindrical part 191. While this protruding part 1915 is fit in the block member 100, the holder 19 is mounted in the block member 100. Accordingly, even when the holder 19 receives high pressure from the upstream side, the holder 19 can remain in a stably mounted state in the block member 100.

The outer passage 81 may be defined by a groove or grooves 19a formed on the outer peripheral surface of the holder 19 or by a groove or grooves 121a formed on the inner peripheral surface 121 of the valve chamber 12. Such a configuration ensures that the outer passage 81 is formed in a position radially outside the holder 19.

The foregoing embodiments are mere examples and give no limitation to the present invention. The present invention may be embodied in other specific forms without departing from the essential characteristics thereof.

REFERENCE SIGNS LIST

1 Upstream pressure regulating valve
2 Downstream pressure regulating valve
3 Intermediate passage
4 Check valve
5 Inflow unit
10 Pressure regulating valve
11 Pressure regulating chamber
12 Valve chamber
13 Valve element
14 Valve seat
15 Piston
16 Coil spring
19 Holder
19a Groove
81 Outer passage
100 Block member
121 Inner peripheral surface
121a Groove
122 Step surface
131 Columnar part
132 Seal part
133 Needle part
134 Valve spring
141 Through hole
191 Bottom-closed cylindrical part
192 Downstream wall part
193 Upstream opening part
194 Downstream opening part
1311 Upstream end portion
1321 Upstream portion
1322 Downstream portion
1911 Inner peripheral surface
1912 Outer peripheral surface
1913 Through hole
1914 Bottom portion
1915 Protruding part
1915a First protruding part
1915b Second protruding part
1915c Downstream end face
1921 Inner peripheral surface
1922 Outer peripheral surface
D Outer diameter (of downstream wall part)
d Outer diameter (of upstream portion of seal part of valve element)
G Fuel gas

What is claimed is:

1. A pressure regulating valve comprising:
a valve seat member;
a valve element configured to come into contact with and separate from the valve seat member to shut off and allow a flow of a fluid;
a piston placed on a downstream side of the valve element in a flowing direction of the fluid to face to the valve element by interposing the valve seat member;
the pressure regulating valve being configured to regulate pressure of the fluid,
wherein the pressure regulating valve further comprises a diffusion member placed on an upstream side of the valve element in the flowing direction of the fluid, and
the diffusion member includes:
a bottom-closed cylindrical part opening toward the upstream side; and
a through hole extending between an inner peripheral surface and an outer peripheral surface of the bottom-closed cylindrical part; and
a valve chamber in which the diffusion member and the valve element are placed,
wherein the diffusion member is provided with a cylindrical downstream wall part extending from a bottom of the bottom-closed cylindrical part toward the downstream side,
the valve element includes an end portion located on the upstream side and housed in an inner peripheral surface of the downstream wall part, and
the pressure regulation valve further includes an outer passage formed between an outer peripheral surface of the downstream wall part and an inner peripheral surface of the valve chamber to allow the fluid flowing out of the through hole to flow through the outer passage, and
during movement of the valve element, the valve element is guided by a downstream opening part of the diffusion member, the downstream opening part being inside the inner peripheral surface of the downstream wall part of the diffusion member.

2. The pressure regulating valve according to claim 1, wherein the through hole includes a plurality of through holes.

3. The pressure regulating valve according to claim 2, the through holes are arranged radially and spaced at predetermined intervals in a circumferential direction of the bottom-closed cylindrical part.

4. The pressure regulating valve according to claim 1, further comprising a block member in which the diffusion member is mounted,
wherein the diffusion member includes a protruding part protruding outwardly in a radial direction at an end portion of the bottom-closed cylindrical part on the upstream side, and
the diffusion member is mounted in the block member so that the protruding part is fit in the block member.

5. The pressure regulating valve according to claim 1, wherein the outer passage is formed of a groove formed in one of an outer peripheral surface of the diffusion member and an inner peripheral surface of the valve chamber.

* * * * *